UNITED STATES PATENT OFFICE.

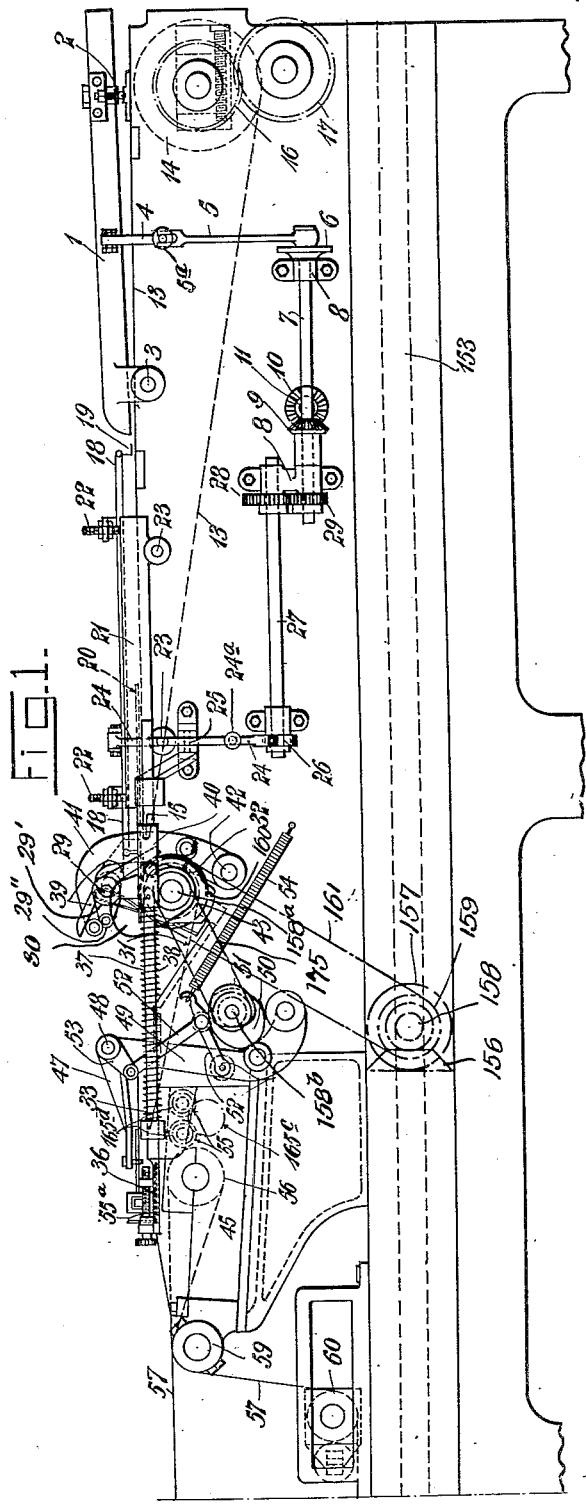

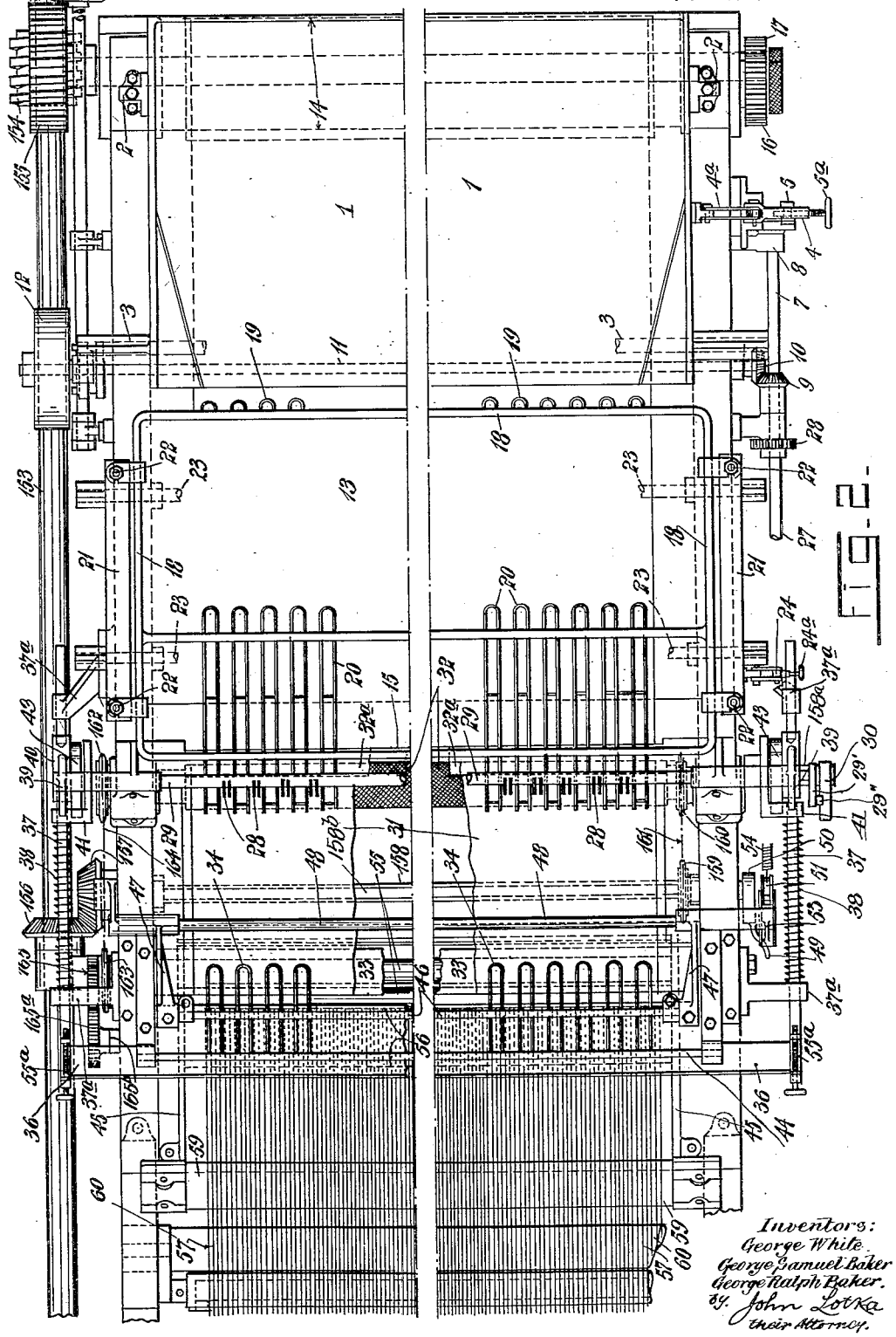

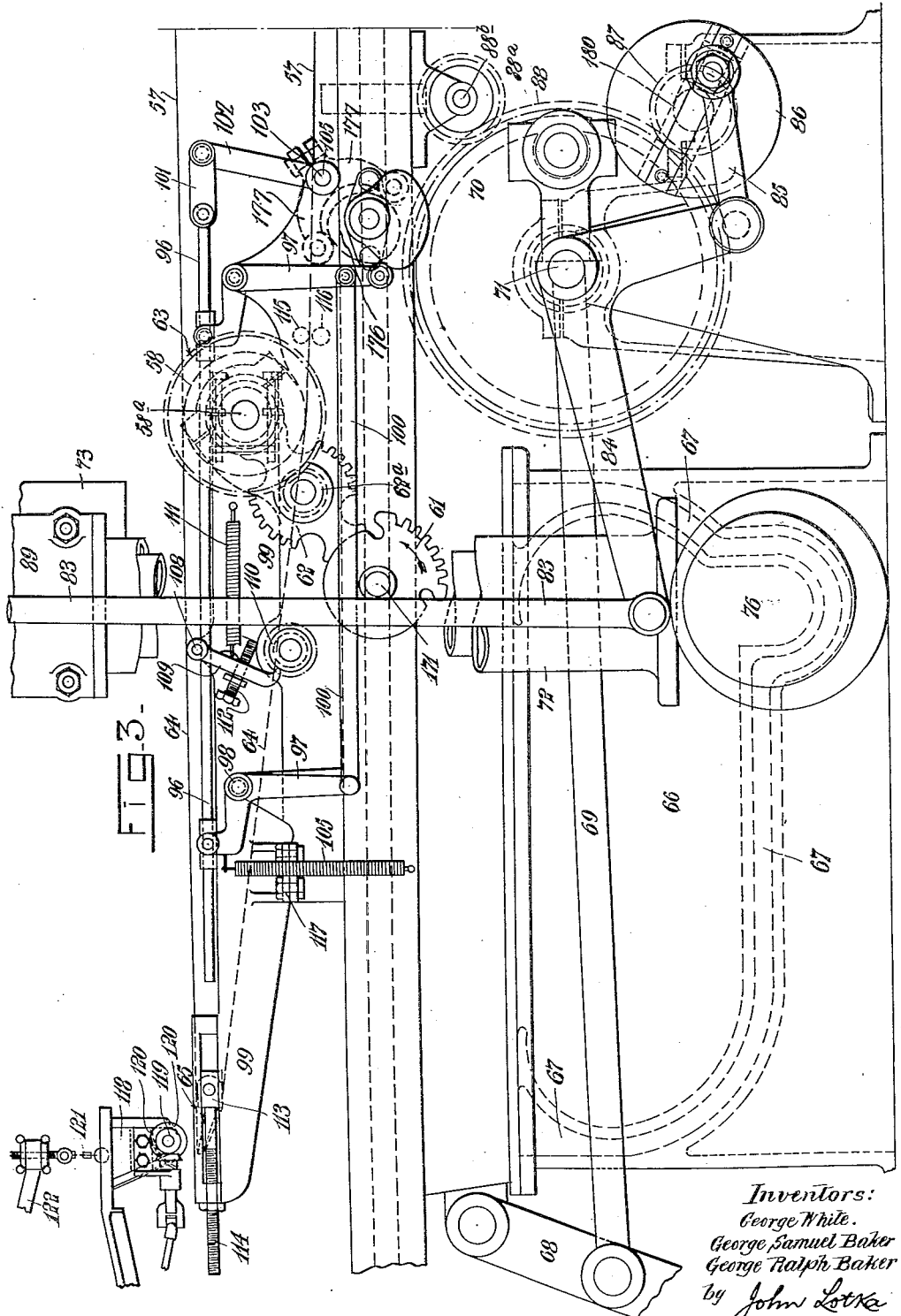

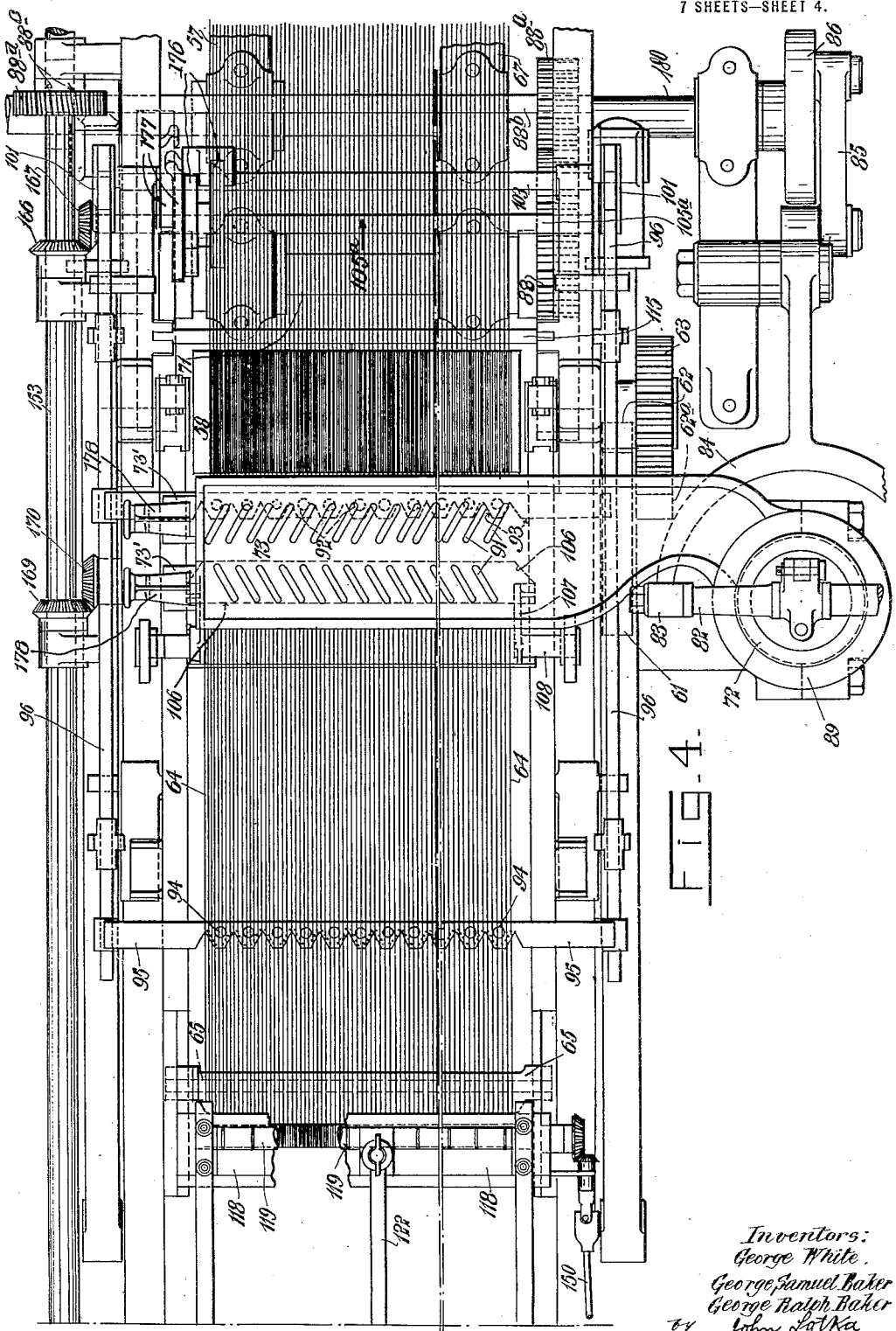

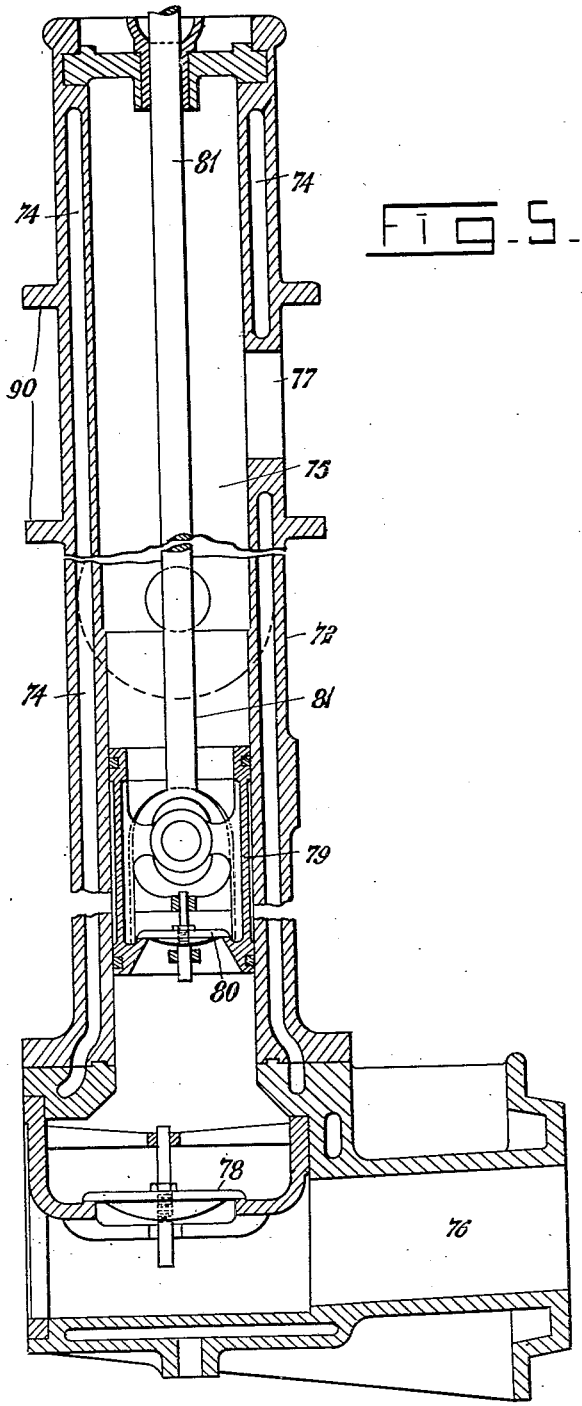

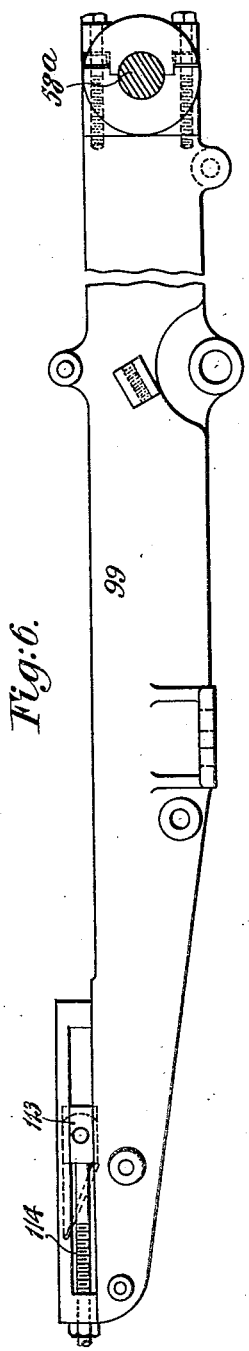
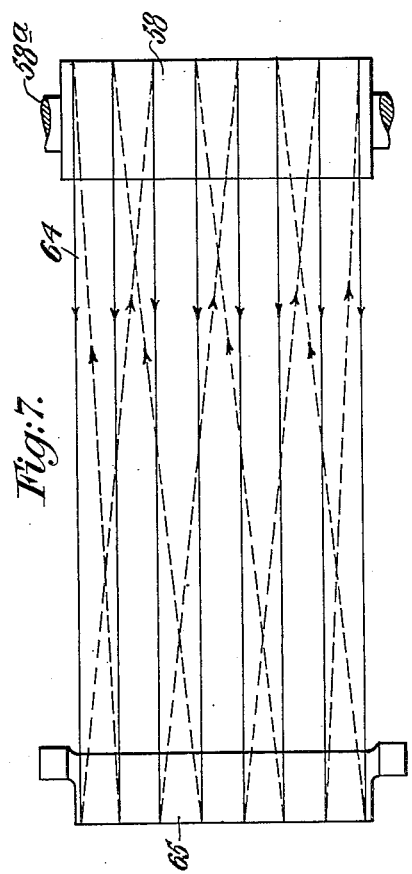

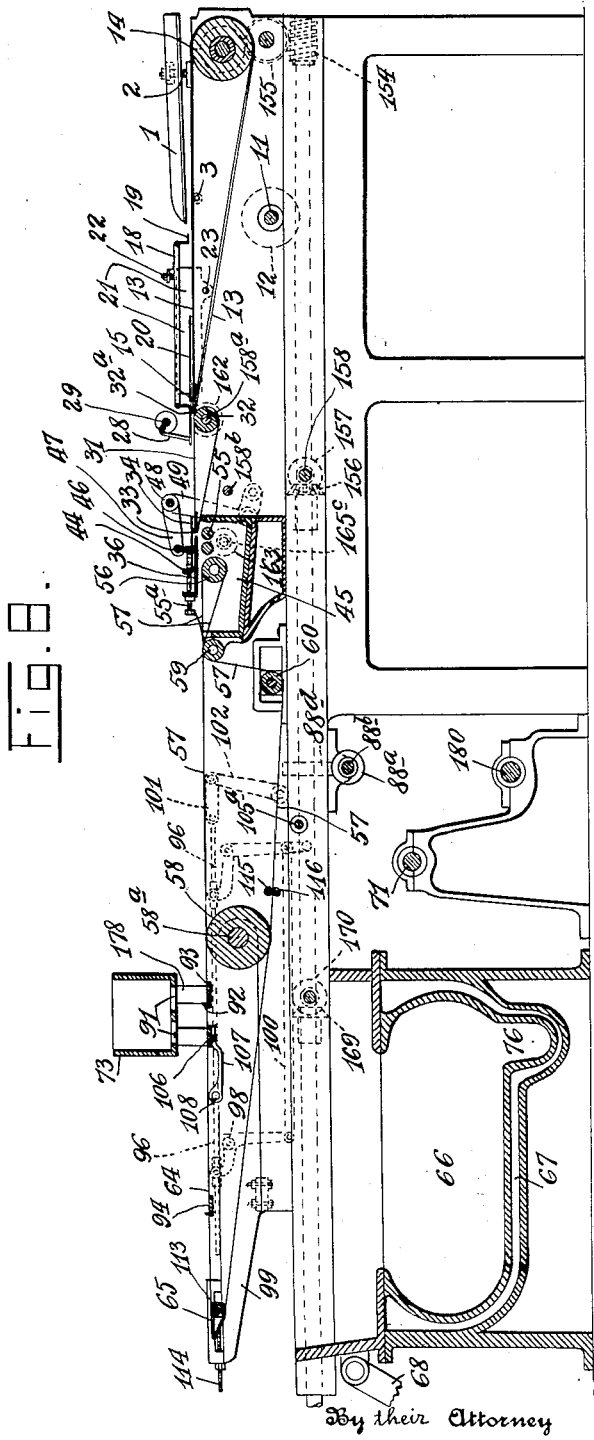

GEORGE WHITE, OF JERSEY CITY, NEW JERSEY, AND GEORGE SAMUEL BAKER AND GEORGE RALPH BAKER, OF WILLESDEN JUNCTION, LONDON, ENGLAND, ASSIGNORS TO PANAYIOTIS D. PANOULIAS, OF JERSEY CITY, NEW JERSEY.

MACHINE FOR COATING CONFECTIONERY.

1,331,548.   Specification of Letters Patent.   Patented Feb. 24, 1920.

Application filed April 20, 1916. Serial No. 92,339.

*To all whom it may concern:*

Be it known that we, GEORGE WHITE, a citizen of the United States of America, and resident of 185 Summit avenue, Jersey City, county of Hudson, State of New Jersey, United States of America, and GEORGE SAMUEL BAKER and GEORGE RALPH BAKER, both subjects of the King of England, and residents of Hythe Road, Willesden Junction, London, N. W., England, have invented certain new and useful Improvements in Machines for Coating Confectionery, of which the following is a specification.

This invention relates to machines for coating confectionery, that is to say, it provides for the covering or inclosure of a "center" or core with a coating substance such as chocolate.

The invention comprises novel means for feeding the centers to be coated to the coating devices; improved means for primarily applying to the bases of the centers a layer of coating material of substantial thickness; a novel disposition of cords or wires for feeding the centers and coated goods through the machine; improved elevating and discharging mechanism for the coating material to be fed on to the centers from above with means for ready removal or displacement of the coating material container, cords or wires and discharge means for cleaning or like purposes; improved arrangements of devices for alining the goods as they travel through the machine; and various novel details of construction and combinations of parts appurtenant to the features above enumerated all as hereinafter described and specifically pointed out in the appended claims.

We will now describe, as an example, a practical embodiment of the invention, the description of the various parts being dealt with substantially in the order above stated and reference being directed to the accompanying drawings wherein—

Figure 1 is a side elevation of the feeding devices and the bottom coating mechanisms of the machine.

Fig. 2 is a plan view of Fig. 1 partly broken away to show parts beneath.

Fig. 3 is a side elevation showing the top-coating mechanisms and parts coöperating therewith.

Fig. 4 is a plan view of Fig. 3 with parts removed for clearness of illustration.

Fig. 5 is a vertical section of a pump shown in Figs. 3 and 4.

Fig. 6 is a side view of the conveyer-carrying frame, Fig. 7 is a plan view of a conveyer hereinafter referred to; and Fig. 8 is a central longitudinal section of the entire machine.

It will be understood that the mechanisms shown in Figs. 3 and 4 follow those shown in Figs. 1 and 2 from right to left and constitute the entire machine, the centers to be coated passing through the entire machine from right to left.

To first refer to Figs. 1 and 2 the centers are fed by hand or automatically to a tray or table 1 which is mounted to be shaken laterally or transversely of the machine by being mounted at the rear on sliding or ball bearings 2 capable of adjustment to vary the angle of inclination and at the front on pivotal sliding bearings or trunnions 3. Shaking movements are imparted to said table 1 by means of links 4ª and a slotted bell-crank 4 in which is adjustably mounted a connecting-rod 5 pivoted at its lower end to a crank-disk 6 mounted on a shaft 7 carried in bearings 8 and actuated by bevel gears 9, 10 from a transverse shaft 11 having a drive pulley 12. The extent of shaking movement is varied by means of a set screw which serves to alter the position of the rod 5 in the bell-crank 4.

The centers slide down the tray under the shaking movement imparted thereto and fall therefrom on to an endless web 13 passing at the rear about a roller 14 and at the front about a knife edge 15, this web being continuously driven as by gearing 16, 17 and above this web is positioned a frame 18 carrying at its rear short spacing members 19 shown as formed of bent wire and between which the centers are caused to pass. The frame is also provided at its forward end with other spacing members 20 similarly formed but of much greater length, the centers being moved along on the web to positions between these members 20 and thus being alined. The said frame 18 is supported on bars 21, by means of studs and nuts 22 so that it may be interchanged and its height adjusted in relation to the web for dealing with centers of different size, said bars being mounted to slide on rods 23, so that they and the frame may be slightly shaken preferably to a lesser extent than the table 1 as by means of a lever 24 pivoted at 25 to the frame of the machine and actuated by a cam 26 mounted on a shaft 27 driven by gears 28, 29 from the shaft 7 above referred to. The movement of lever 24 can be varied by means of a set-screw 24ª screwed through said lever and bearing with its end against the side of the machine frame.

At the forward end of the frame 18 is located a gate or barrier comprising fingers 28 (Fig. 2) mounted on a transverse rod 29 provided at one end with a crank 29' carrying a roller 29" engaged by a cam 30 on the shaft 158ª, to rock the rod and periodically lift the fingers (in which position they are shown in Figs. 1 and 2) to allow the centers to pass; in their lower or dropped position, the fingers are in the path of the centers, thus arresting and alining them, and spacing one row of centers from the other.

After being released by said gate or barrier, the centers pass on to a second web 31 driven at a faster speed than the web 13 and shown as passing at its rear end about a roller 32 and at its forward end about a knife edge 33 there being a substantially very small interval or gap between the forward edge of the first web and the rear edge of the second (with interposed dead plate 32ª if desired) and at the forward end of this second web there is provided above same another series of spacing-members 34 carried by a cross rod 44 for the purpose of further alining the centers on said web.

The said spacing-members also pass over a transverse sliding stripping-plate 36 normally in position almost in contact with the end of the web 31 and which receives the alined centers therefrom, this being effected by means of a series of brushes entering the spaces between the alining members 34. These brushes are carried on the lower surface of a transverse rod 46 forming the forward part of a frame 47 the rear part of which is mounted on another transverse rod 48 which is given parallelogram movements whereby the frame 47 is moved to sweep the centers in between the spacing members on to the sliding plate 36, then rises at the end of its path, passes back in raised condition and finally down again to commence a new sweeping movement. The rod 48 is carried by pivoted arms 49, one at each side of the machine and these arms are swung and the rod rocked to produce the movements described by means of two cams 50 and 51, mounted on a shaft 158ᵇ hereinafter referred to, the cam 50 actuating one of the arms 49 and cam 51, a lever-system 52 connected to an arm 53 on the rod, the lever system being shown as held in contact with its cam by a spring 54. Sliding movement is imparted to the plate 36 by means of rods 37 connected thereto one at each side of the machine carried in bearings 37ª and each under the action of a spring 38 coiled about it to return the plate to normal position and the rods are operated each by means of a double-armed finger 39 loosely mounted on the gate or barrier rod 29, this finger loosely engaging a slot in a sleeve 40 on the rod 37 and being actuated by an arm 41 pivoted at 42 and operated by a cam 43 on the spindle of the web roller 32 in such a manner that the rods 37 are periodically moved to the right taking the plate with them. The plate 36 is adjustably mounted on the rods 37 as by means of the adjusting screws 55ª in order to be able to bring it into correct position in relation to the web 31. The centers are swept off the plate 36 by means of the fixed bar 44 extending over the plate in close proximity thereto so that as the plate moves away from the web the centers drop off into a mass of chocolate or coating material contained in a tank 45.

Within the aforesaid chocolate tank 45 are a series of almost contacting rollers 55 two of which are shown beneath the point where the centers drop off the plate 36. These rollers are partly immersed in the chocolate on to which the centers have been dropped from the stripping plate 36 to receive a bottom coating of chocolate and are rotated in a forward direction. The chocolate in the tank is kept at the proper consistency, as by jacketing the tank with hot water or other suitable medium, and the purpose of giving the centers the preliminary bottom coating is that when the centers are subsequently completely coated the shell of chocolate at the bottom of the coated goods may be thickened by the additional thickness of chocolate previously applied.

The rollers 55 in the tank 45 pick up chocolate from the tank and transfer it from one to the other over their upper surfaces in a sheet to the end of the series in their direction of rotation and at the same time convey the centers along in a similar direction. Substantially in contact with the last roller 55 is a grooved roll 56 around which passes an endless cord or wire 57 the upper surface of said cord comprising a series of parallel strands as shown in Fig. 2 forming an endless conveyer to which is imparted an intermittent movement by means hereinafter described. The action of this mechanism is such, that during the period of rest of the cord conveyer 57 the revolving rollers 55 pile up a wave of chocolate in the tank on to which the centers are dropped by the feeding mechanism as described and that when the conveyer is moved forward it also pulls forward the chocolate from said wave with the centers floating thereon, the main portion of the chocolate wave gradually draining down into the tank again to be recirculated by the rollers 55.

The conveyer 57 is composed of an endless wire or cord passed at one end over the grooved roller 56 as aforesaid and at the other end about another grooved roller 58 (Figs. 3 and 4). The cord also passes over other guide rollers 59 and 60 the former being grooved and the latter being shown as mounted in adjustable bearings for the purpose of taking up any slack in the wire. In passing the cord about the grooved rollers 56, 58, 59 and 60 it is placed into alternate grooves and then into the intermediate ones in such a manner that in the part constituting the upper run of the conveyer surface, on which the goods are carried, the cords are parallel, but in the lower run said cords are crossed, this arrangement avoiding any slackness of individual runs and dispensing with the use of jockey or similar rollers, as in known constructions of endless wire or cord conveyers.

Starting from the roll 56 the upper run of the cord is passed about roller 58 and the return is taken about the tightening roller 60 and then up over the grooved roller 59 so that the cords just touch the cords of the upper run whereupon they are carried through the tank 45 and around the roller 56 to the top run again to receive the bottom coated goods.

By taking the return cords to the tank and thence to the upper conveyer run, the cords and roller 59 act as efficient scraping means to remove excess of chocolate from the bottomed goods as they travel forward, leaving a uniform thickness of chocolate only adhering to the centers.

The conveyer driving roller is preferably the roller 58 (Figs. 3 and 4) and in the former figure there is illustrated a conventional form of interrupted gearing 61, 62, 63 for producing the intermittent movement of the conveyer which movement transfers the bottom-coated goods to the flooding or top coating mechanism, previously to reaching which however the goods are transferred to a second wire or cord conveyer 64 similar to the conveyer 57, and clearly shown in Fig. 7, wherein the upper runs are shown by full lines and the lower runs by broken lines, such transfer being shown as effected by duplicating the grooves in the roller 58 and passing the wires of conveyer 64 about said grooves alternately at one end and about a knife edge 65 at the other end and back again with lower crossing as in the conveyer 57 previously described. The roller 58 thus acts as a driving-roller for both conveyers. The flooding or top-coating mechanism includes or comprises a receptacle or tank 66 for containing the coating material such as chocolate, this tank being preferably jacketed as at 67 for reception of steam or hot water to maintain the material at the correct consistency. It also contains stirring or mixing means (not shown) which may be operated by the arm 68, rod 69 and crank disk 70 mounted on a shaft 71, the latter being driven off the main shaft 180 by gears 87, 88. A suitable form of tank and appurtenant parts may be used known as a "conche" apparatus and from the receptacle leads a trunk 72 containing a pump by which the material is elevated to a feed tank 73 located above the flooding conveyer 64. Details of said trunk and pump are also shown in Fig. 5 wherein the trunk is shown as jacketed at 74 for reception of a heating medium and provided with the pump chamber 75. 76 designates the inlet connection from the receptacle 66 and 77 the outlet connection to the upper tank 73. In the lower part of the pump chamber is a lift valve 78 and the pump piston or plunger 79 contains a valve 80 adapted on the downstroke to open for passage of coating material and on the up-stroke to carry said material upward and discharge it through the connection 77. The plunger has connected thereto the rod 81 passing outward through the top of the trunk where it is attached to a cross-head 82 (Fig. 4) actuated by rods 83, one at each side, which in turn are operated by a forked lever 84 connecting-rod 85, and crank-disk 86, the latter being mounted on the main drive shaft 180.

The flooding tank 73 has an extension 89 which is fulcrumed on the trunk 72 between the shoulders 90 thereon (Fig. 5) in such a manner that said tank may be swung out of the way from across the conveyer in a horizontal plane. Angle irons 73' on the free side of the tank 73 will hold the tank in the proper operative position with respect to the conveyer 64, by their contact with stationary stops 178 (Fig. 4). The base of the tank 73 is provided with a plurality of discharge slots or outlets 91 through which the coating material is discharged on to the centers on the conveyer 64, excess of such material passing through the cords of said conveyer and returning to the receptacle 66 to be again circulated by the pump.

The centers are assisted through the stream of coating material issuing from the flooding tank by means of alining fingers 92 carried by a transverse plate 93 and after the flooding operation are again subjected to an alining operation by another series of fingers 94 carried by a further transverse plate 95. The fingers are caused to rise between the cords of the conveyer and then move horizontally with the conveyer, this horizontal movement commencing immediately before the travel of the conveyer. For this purpose the plates 93 and 95 carrying the pins are mounted on longitudinally and vertically movable rods 96 one at each side carried by bell-cranks 97 pivoted at 98 upon a frame 99 and interconnected by a link 100. The shape or construction of the frame 99 is shown in Fig. 6. The rods are each also attached at one end to a link 101 pivoted to an arm 102 mounted on a rock-shaft 103 which imparts longitudinal movement to the rods and consequently to the fingers while the rising movements are produced by a cam 104 mounted on a shaft $105^a$ and acting on an extension of the rear bell-crank 97. A spring 105 attached to the forward bell-crank keeps the said extension in contact with the cam. The pins are thus given a more or less elliptical path of movement so that they can properly engage behind the goods, then move along with the conveyer for a certain distance, and finally return to normal position.

It is also desirable that during the flooding operation the cords of the conveyer should be tapped or shaken to remove any excess of coating material from the goods and for this purpose we have provided a plate 106 extending transversely across below the conveyer and mounted on arms 107 carried by a transverse rod 108. This rod is given rapid rocking movements through a small arc by means of an arm 109 acted on by a ratchet 110, the arm being drawn to said ratchet by a spring 111 and capable of adjustment to vary the degree of tapping as by means of a set-screw 112. The plate 106 being arranged in the path of the excess coating material passing down between the conveyer cords, it will catch part of this material and apply it to the bottom of the goods while they are carried forward on the conveyer. The tapping action of the plate 106 therefore insures a more thorough coating of the center bottoms.

It may here be stated that the knife-edge 65 at the discharge end of the conveyer 64 is slightly grooved to receive the cords and is adjustably mounted in the frame 99 as by means of sliding blocks 113 and set screws 114 to control the tension of the cords. The cords of the conveyer 57 are also shown on their return-run as passing between a pair of rods 115, 116, one of which is grooved and the other plain to clean the cords.

As will be readily seen from Fig. 3 the flooding-conveyer and the alining and tapping devices are all carried by the frame 99 and this frame is pivoted about the axis of the conveyer roller 58 so that it and the parts carried thereby can be swung in a vertical plane after having disabled connections such as bolts 117 between this frame and the frame of the machine whereby cleaning or repairs may be more easily effected.

The said frame 99, knife edge 65, roller 58 one or both of rods 115, 116 and other parts of the flooding mechanisms may be heated, if desired, in any well known or approved manner (not shown.)

While on said flooding conveyer (or if desired on another similar conveyer to which they may be transferred) the coated goods may be decorated for example by applying to the top thereof, strips, coils or other designs of the same material as the main coating or of other material according to will, but this decorating device forms no part of the present invention, being described and claimed in a co-pending application Serial No. 120,236, filed September 15th, 1915, which has resulted in the issue of Letters Patent of the United States No. 1,268,195, dated June 4th, 1918.

Part of this decorating device designated by the reference character 118 to show its location in relation to the flooding conveyer is illustrated in Figs. 3 and 4.

The means by which primary movements are imparted to the different mechanisms described are not material to the present invention and may be any which are appropriate to the design or capacity of the machine or other existing conditions, but we have shown a drive shaft 153 driven off the main drive shaft 180 by gears 87, 88, $88^a$, shaft $88^b$, worm-gearing $88^c$, $88^d$ and extending along one side of the machine and from which the mechanisms are actuated as follows:

Worm and worm-wheel 154 and 155 for driving web roller 14 through the gears 17 and 16; bevel-gears 156, 157, shaft 158, chain-wheels 159, 160 and chain 161 for driving shaft $158^a$ carrying the web roller 32. The cam 30 before mentioned is also mounted on shaft $158^a$. The latter has mounted thereon a chain-wheel 162 which through chain-wheel 163 and chain 164 drives gear 165 meshing with a gear $165^a$ on a shaft $165^b$ carrying a gear wheel $165^c$ meshing with gear wheels $165^d$ on the tank rollers 55. On shaft $158^a$ is a chain wheel about which passes a chain 175 passing about another chain wheel on the shaft $158^b$ which carries the cams 50 and 51 whereby the latter are actuated. Bevel gears 166 and 167 drive the shaft $105^a$ for the alining cam 104 and shaft $105^a$ has on it a double cam 176 which acts on a double-armed lever 177 on shaft 103 to rock the same, this shaft also being an element of the alining device. Shaft 71 and parts actuated thereby, viz. the pump and conche steering device, may have a suitable separate pulley or drive (not shown). The conveyers 57 and 64 are driven off the shaft 153 by bevel gears 169, 170 and shaft 171, thence by the interrupted gearing 61, 62 and gears $62^a$, 63, the gear 63 being mounted on shaft 58ᵃ of the roller 58.

What we claim as our invention and desire to secure by Letters Patent of the United States is:—

1. In a confectionery coating machine, the combination of a conveyer comprising a roller at each end and an endless flexible member passed about said rollers, means for imparting an intermittent motion to said conveyer and rollers, a receptacle for coating material in which one of said conveyer rollers is located and a plurality of continuously revoluble rollers in said receptacle adapted to produce a wave of coating material on which the "centers" to be coated are deposited and to transfer said "centers" to the conveyer.

2. In a confectionery coating machine, the combination of a conveyer comprising a roller at each end, and an endless flexible member passed about said rollers, means for imparting an intermittent motion to said conveyer and rollers, a receptacle for coating material in which one of said conveyer rollers is located, a plurality of continuously rotated rollers in said receptacle adapted to produce a wave of coating material on which the "centers" to be coated are deposited and to transfer such "centers" to the conveyer, and an intermediate conveyer roller adjacent said receptacle about which the lower runs of the flexible conveyer member are passed in contact with the upper runs thereof.

3. In a confectionery coating machine the combination of a feed device for the "centers" to be coated comprising a plurality of endless webs disposed end to end, means for moving said webs at different speeds, members above said webs for arranging the "centers" in spaced rows, a receptacle for coating material adapted to receive the centers from the final web, a plurality of continuously revoluble rollers in said receptacle adapted to produce a wave of coating material onto which the "centers" are deposited, and a conveyer receiving the centers from said receptacle comprising a roller at each end one of which is located in the receptacle and an endless flexible member passed about said rollers.

4. In a confectionery coating machine the combination of a feed device for the "centers" to be coated comprising a plurality of endless webs disposed end to end, means for moving said webs at different speeds, members above said webs for arranging the "centers" in spaced rows, a series of rollers adjacent to the discharge point of the final web, and a conveyer adapted to receive the centers from said rollers comprising an endless flexible member, and rollers about which the same passes at each end, said last-named rollers being provided with peripheral grooves into alternate ones of which the flexible member is first passed and then returned into the intermediate grooves the flexible member forming parallel strands in the upper run and crossed strands in the lower run.

5. In a confectionery coating machine, the combination of a feed device for the "centers" to be coated comprising two endless webs disposed end to end, means for moving said webs at different speeds, a gate positioned adjacent the meeting plane of the two webs for controlling the transfer of "centers" from one web to the other, means for moving said gate at determined intervals to permit passage of the centers, a series of rollers adjacent to the discharge point of the second web and a conveyer adapted to receive the centers from said rollers comprising an endless flexible member and rollers about which the same passes at each end, said last-named rollers being provided with peripheral grooves into alternate ones of which the flexible member is first passed and then returned to the intermediate grooves to produce parallel strands on the upper run and crossed strands on the lower run, and an intermediate grooved roller about which the lower strands of the flexible member pass in contact with the strands constituting said upper run.

6. In a confectionery coating machine, the combination of a feed device for the "centers" to be coated comprising two adjacent endless webs disposed end to end with their upper surfaces in the same horizontal plane, means for moving the second web at a faster speed than the first, a frame above said webs, members carried by said frame for arranging the "centers" in spaced rows, means for shaping said frame and spacing members, a gate positioned between said two webs for controlling the transfer of "centers" from one web to the other, means for moving said gate at determined intervals to permit passage of the centers, a slidable stripping member at the delivery end of said second web and a fixed abutment in proximity to said stripping member adapted to sweep the "centers" from said member during movement of the latter.

7. In a confectionery coating machine, the combination of a feed device comprising a plurality of endless webs positioned end to end to convey the "centers" to be coated, spacing and alining devices for the "centers" on said webs, and two following conveyers the first receiving the centers from the feed device each of said conveyers comprising an endless flexible member, rollers about which remote ends of said conveyers pass and a common roller about which adjacent ends of said conveyers pass, said rollers being provided with peripheral grooves into alternate ones of which the flexible members of the conveyers are first passed and then returned into the intermediate grooves, the flexible members forming parallel strands in the upper runs of the conveyers and crossed strands in the lower runs thereof, and means for imparting motion to said common roller for actuating both conveyers.

8. In a confectionery coating machine, the combination of a feed device comprising a plurality of endless webs positioned end to end to convey the "centers" to be coated, spacing and alining devices for the "centers" on said webs, a receptacle containing coating material into which the centers are deposited from the final web, revolving rollers in said receptacle adapted to feed the coating material and centers thereon forward, and two following conveyers the first receiving the centers from the receptacles, each of said conveyers comprising an endless flexible member, rollers about which remote ends of said conveyers pass, and a common roller about which adjacent ends of said conveyers pass, said rollers being provided with peripheral grooves into alternate ones of which the flexible members of the conveyers are first passed and then returned into the intermediate grooves, the flexible members forming parallel strands in the upper runs of the conveyer and crossed strands in the lower runs thereof, and means for imparting intermittent motion to said common roller for intermittently actuating both conveyers.

9. In a confectionery coating machine, the combination of a conveyer for the goods to be coated, including an endless cord or wire arranged to produce a plurality of parallel supporting strands, and a roller at each end about which said cord or wire passes, alining devices for the goods on said conveyer, means for removing superfluous coating material from the goods on the conveyer, and a support on which said conveyer, alining devices and removing devices are mounted, said support being mounted for pivotal movement in a vertical plane about the axis of one of the end conveyer rollers.

10. In a confectionery coating machine, the combination of a feed device for the "centers" to be coated, comprising two endless webs, means for moving said webs at different speeds, means for controlling the time of passage of "centers" from one web to the other, a receptacle containing coating material into which the "centers" are deposited from the last web to receive a bottom coating, revolving rollers in said receptacle adapted to feed the coating material and "centers" thereon forward, an endless cord or wire conveyer partly contained in said receptacle and adapted to receive the "centers" from said rollers, means for moving said conveyer intermittently, a second receptacle for coating material disposed above the conveyer and adapted to discharge or flood said material on to the "centers" from above, and alining devices for the goods on the conveyer adapted to act thereon before and after the flooding operation.

11. In a confectionery coating machine, the combination of a feed device for the "centers" to be coated comprising two endless webs, means for moving said webs at different speeds, members above said webs for arranging the "centers" in spaced rows, means for shaking said spacing members, means positioned adjacent the meeting plane of said webs for controlling the time of passage of "centers" from one web to the other, a receptacle containing coating material into which the "centers" are deposited from the second web to receive a bottom coating, revolving rollers in said receptacle adapted to feed the coating material and "centers" thereon forward, an endless cord or wire conveyer partly contained in said receptacle and adapted to receive the "centers" from said rollers, said conveyer comprising an endless flexible member and peripherally grooved rollers about which the flexible member passes at each end with parallel upper strands and crossed lower strands, means for moving said conveyer intermittently, a second receptacle for coating material disposed above said conveyer and adapted to discharge or flood said material on to the "centers" from above and alining devices for the goods on the conveyer adapted to act thereon before and after the flooding operation.

12. In a confectionery coating machine, the combination of a feed device for the "centers" to be coated comprising two endless webs, means for moving said webs at different speeds, members above said webs for arranging the "centers" in spaced rows, means for shaking said spacing members, means positioned adjacent the meeting plane of said webs for controlling the time of passage of "centers" from one web to the other, a receptacle containing coating material into which the "centers" are deposited by the second of the above said webs to receive a bottom coating, revolving rollers in said receptacle adapted to feed the coating material and "centers" thereon forward, an endless cord or wire conveyer partly contained in said receptacle and adapted to receive the "centers" from said rollers, said conveyer comprising an endless flexible member and peripherally grooved rollers about which the flexible member passes at each end with parallel upper strands and crossed lower strands, means for moving said conveyer intermittently, a second conveyer similar to that first mentioned the end roller of one conveyer being common to both, a second receptacle for coating material disposed above said last mentioned conveyer and adapted to discharge or flood said material on to the "centers" from above, and alining devices for the goods on the conveyer adapted to act thereon before and after the flooding operation.

13. In a confectionery coating machine, the combination of a feed device for the "centers" to be coated comprising two endless webs, means for moving said webs at different speeds, members above said webs for arranging the "centers" in spaced rows, means for shaking said spacing members, a gate positioned adjacent the meeting plane of said webs for controlling the passage of "centers" from one web to the other, means for moving said gate at determined intervals to permit passage of the "centers", a receptacle containing coating material into which the "centers" are deposited from the second of the above-said webs to receive a bottom coating, revolving rollers in said receptacle adapted to feed the coating material and "centers" thereon forward, an endless cord or wire conveyer partly contained in said receptacle and adapted to receive the "centers" from said rollers, said conveyer comprising an endless flexible member about which peripherally grooved rollers about which the flexible member passes at each end with parallel upper strands and crossed lower strands, means for moving said conveyer intermittently, a second conveyer similar to that first mentioned, the end roller of one conveyer being common to both, a second receptacle for coating material disposed above said last mentioned conveyer and adapted to discharge or flood said material on to the "centers" from above, said receptacle being adapted to be swung in a horizontal plane to a position laterally of the flooding zone, alining devices for the goods on the conveyer adapted to act thereon before and after the flooding operation, means for removing superfluous coating material from the goods after said flooding operation, and a support carrying the last-mentioned conveyer, alining devices and removing means mounted for pivotal movement in a vertical plane about the axis of one of the conveyer rollers.

14. In a confectionery coating machine, a conveyer traveling lengthwise intermittently, a receptacle for coating material into which said conveyer extends, and a plurality of revoluble rollers located in said receptacle, and adapted to produce a wave of coating material on which the centers to be coated are deposited and to transfer said centers to the conveyer.

15. In a coating machine, a conveyer traveling lengthwise intermittently, a receptacle for coating material, and a plurality of revoluble rollers located in said receptacle adjacent to the receiving end of said conveyer, and adapted to produce a traveling wave of coating material on which the centers to be coated are deposited and with which they are carried forward to said conveyer.

16. In a coating machine, a receptacle for coating material, means for supplying thereto from above the centers to be coated, a set of parallel rollers located in said receptacle beneath the point at which the centers are supplied, and rotatable about horizontal axes, to produce a traveling wave of coating material and carry the centers forward on said wave, and an intermittently traveling longitudinally-moving conveyer for receiving the centers thus fed.

17. In a coating machine, a receptacle for coating material, means for supplying thereto from above the centers to be coated, a set of parallel rollers located in said receptacle beneath the point at which the centers are supplied, and rotatable about horizontal axes, to produce a traveling wave of coating material and carry the centers forward on said wave, and a longitudinally traveling conveyer movable intermittently transversely of the axes of said rollers, and adapted to receive the centers fed by the action of said rollers.

18. In a confectionery coating machine, a receptacle for coating material, revoluble rollers located in said receptacle and adapted to produce a wave of coating material on which the centers to be coated are carried forward, an intermittently-traveling endless conveyer extending into said receptacle to a point adjacent to said rollers and having its upper run adapted to receive the centers from said wave, and a guide, located adjacent to said receptacle, for causing the lower run of said conveyer to pass in contact with the upper run.

19. In a coating machine, a receptacle for coating material, revoluble rollers located in said receptacle and adapted to produce a wave of coating material on which the centers to be coated are fed forward, an intermittently-traveling conveyer comprising peripherally-grooved rollers one of which is located in the receptacle adjacent to the last of the first-named rollers, and further comprising an endless flexible member passed first into alternate grooves of said grooved rollers and returned into the intermediate grooves, said flexible member forming parallel strands in the upper run and crossed strands in the lower run, and a guide, located adjacent to said receptacle, for causing the crossed strands on the lower conveyer run to pass in contact with the parallel strands on the upper conveyer run.

20. In a coating machine, a receptacle for coating material, means for supplying thereto the centers to be coated, and two consecutive conveyers adapted to receive the centers from said receptacle, each of said conveyers comprising an endless flexible member formed into a plurality of strands, supports for the remote ends of said conveyers, and a common roller for the adjacent ends of said conveyers, said roller being provided with peripheral grooves to receive the ends of the strands of one conveyer in alternation with the adjacent ends of the strands of the other conveyer.

21. In a coating machine, a receptacle for the coating material, means for carrying forward the goods to be coated in said receptacle, a movable stripping member at the delivery end of said means, and a fixed abutment located above said stripping member in the path of the goods and adapted to sweep the goods from said member and cause them to drop into said receptacle.

22. In a coating machine, a receptacle for the coating material, a conveyer for carrying forward the goods to be coated in said receptacle, a stripping member located adjacent to the forward end of said conveyer and movable in the same direction as the conveyer, and a fixed abutment located above said stripping member in the path of the goods and to sweep the goods from said member and cause them to drop into said receptacle.

In witness whereof we have signed this specification.

GEORGE WHITE.
GEORGE SAMUEL BAKER.
GEORGE RALPH BAKER.